United States Patent
Di et al.

(10) Patent No.: US 10,488,504 B2
(45) Date of Patent: Nov. 26, 2019

(54) SYSTEM AND METHOD FOR AUTOMATIC TRAILER DETECTION

(71) Applicant: Autoliv ASP, Inc., Ogden, UT (US)

(72) Inventors: Junru Di, Ann Arbor, MI (US); Shan Cong, Superior Township, MI (US); Kapil Gupta, Ann Arbor, MI (US); Malakeh Sivako, Dearborn, MI (US); Debra Rice, Redford, MI (US); Joe Attard, Dearborn, MI (US)

(73) Assignee: VEONEER US, INC., Southfield, MI (US)

( * ) Notice: Subject to any disclaimer, the term of this patent is extended or adjusted under 35 U.S.C. 154(b) by 273 days.

(21) Appl. No.: 15/410,621

(22) Filed: Jan. 19, 2017

(65) Prior Publication Data

US 2018/0203106 A1    Jul. 19, 2018

(51) Int. Cl.
*G01S 13/04* (2006.01)
*G01S 13/93* (2006.01)
*G01S 7/292* (2006.01)
*G08G 1/16* (2006.01)

(52) U.S. Cl.
CPC ............ *G01S 13/04* (2013.01); *G01S 7/2922* (2013.01); *G01S 13/931* (2013.01); *G08G 1/165* (2013.01)

(58) Field of Classification Search
CPC .... G01S 13/04–40; G01S 13/87; G01S 7/411; G01S 13/931; G01S 7/2922; G01S 2013/9378; G08G 1/165
See application file for complete search history.

(56) References Cited

U.S. PATENT DOCUMENTS

| | | | |
|---|---|---|---|
| 5,448,243 A | 9/1995 | Bethke | |
| 7,786,849 B2 * | 8/2010 | Buckley | G08G 1/165 180/271 |
| 8,010,252 B2 * | 8/2011 | Getman | B60T 8/1755 280/432 |
| 9,211,889 B1 | 12/2015 | Hoetzer et al. | |

(Continued)

FOREIGN PATENT DOCUMENTS

EP    2983006    2/2016

OTHER PUBLICATIONS

International Search Report for PCT/US2018/014625, dated Mar. 26, 2018, 2 pgs.

*Primary Examiner* — Matthew M Barker
(74) *Attorney, Agent, or Firm* — Brinks Gilson & Lione

(57) ABSTRACT

A system and method for determining when a trailer is located behind a vehicle includes at least one detection device configured to detect objects located behind the vehicle and a processor. The processor is in communication with the at least one detection device and a plurality of signals generated by the vehicle. The processor receives data from the at least one detection device. The data includes a plurality of targets detected by the at least one detection device. Next, the processor determines if one or more clusters exists and clusters the targets into at least one cluster to form cluster features when one or more clusters exist. The processor determines vehicle state based on the vehicle dynamic features from the plurality of signals generated by the vehicle as well as global features from data from the at least one detection device and determines when the trailer is located behind the vehicle based on the cluster features, the vehicle state, and/or the global features.

20 Claims, 7 Drawing Sheets

(56) References Cited

U.S. PATENT DOCUMENTS

| | | | | |
|---|---|---|---|---|
| 9,227,474 | B2* | 1/2016 | Liu | B60D 1/245 |
| 9,558,409 | B2* | 1/2017 | Pliefke | B60R 1/00 |
| 9,594,155 | B2* | 3/2017 | Cashler | G01S 7/411 |
| 9,779,313 | B2* | 10/2017 | Pliefke | B60R 1/00 |
| 9,910,151 | B2* | 3/2018 | Cashler | G01S 7/40 |
| 10,127,459 | B2* | 11/2018 | Hu | G06K 9/00791 |
| 2002/0019697 | A1 | 2/2002 | Cong et al. | |
| 2005/0024258 | A1* | 2/2005 | Matsuoka | G01S 7/411 |
| | | | | 342/70 |
| 2006/0176160 | A1 | 8/2006 | Zoratti et al. | |
| 2008/0186204 | A1 | 8/2008 | Buckley | |
| 2009/0005932 | A1* | 1/2009 | Lee | B60D 1/30 |
| | | | | 701/41 |
| 2012/0093359 | A1 | 4/2012 | Kurien et al. | |
| 2015/0266472 | A1 | 9/2015 | Ferguson et al. | |
| 2015/0293216 | A1 | 10/2015 | O'Dea et al. | |
| 2015/0325126 | A1* | 11/2015 | Schwindt | G08G 1/16 |
| | | | | 701/36 |
| 2016/0041258 | A1 | 2/2016 | Cashler et al. | |
| 2016/0325680 | A1 | 11/2016 | Curtis et al. | |

* cited by examiner

SYSTEM AND METHOD FOR AUTOMATIC TRAILER DETECTION

BACKGROUND

1. Field of the Invention

The present invention generally relates to systems and methods for detecting the presence of a trailer behind a vehicle.

2. Description of Related Art

Vehicles, such as automobiles, have been equipped with radar systems for detecting objects such as other vehicles proximate to the host vehicle. This type of object detection is desirable so as to relay this information to the driver of the vehicle. For example, using data generated by the radar system, the driver of the vehicle may be informed that another vehicle is in their blind spot through the use of visual and/or audible feedback provided to the driver. Additionally, these radar systems can be utilized to provide information to the driver to prevent crashes with other vehicles, pedestrians, animals, or other objects. Further, this information can be relayed to the vehicles braking, steering and/or other vehicle systems so as to actively prevent the vehicle from crashing into one or more objects.

However, if a trailer is connected to the vehicle, these radar systems and the information provided to the driver or other vehicle systems must be modified so as to consider the presence of the trailer located behind the vehicle. For example, changing lanes without a trailer connected to the vehicle may be acceptable so long as the trailer is not present but may be unacceptable if the trailer is present, as the trailer significantly increases the area needed to change lanes safely.

SUMMARY

A system and method for determining when a trailer is located behind a vehicle includes at least one detection device, such as a radar system, configured to detect objects located behind the vehicle and a processor. The processor is in communication with the at least one detection device and a plurality of signals generated by the vehicle. The processor is configured to execute a method for determining when a trailer is located behind the vehicle.

This method, when executed by the processor, receives data from the at least one detection device. The data includes a plurality of targets detected by the at least one detection device. The processor is configured to identify if one or more clusters exists. When at least one cluster has been identified, cluster features can be formed by cluster(s). The processor determines the vehicle state based on vehicle dynamic features from the plurality of signals generated by the vehicle as well as global features from data from the at least one detection device. As will be described in greater detail in the paragraphs that follow, the processor determines when the trailer is located behind the vehicle based on the vehicle state, the cluster features and/or the global features. The global features may also be used for enhancement.

Further objects, features, and advantages of this invention will become readily apparent to persons skilled in the art after a review of the following description, with reference to the drawings and claims that are appended to and form a part of this specification.

DETAILED DESCRIPTION

Figure 1:
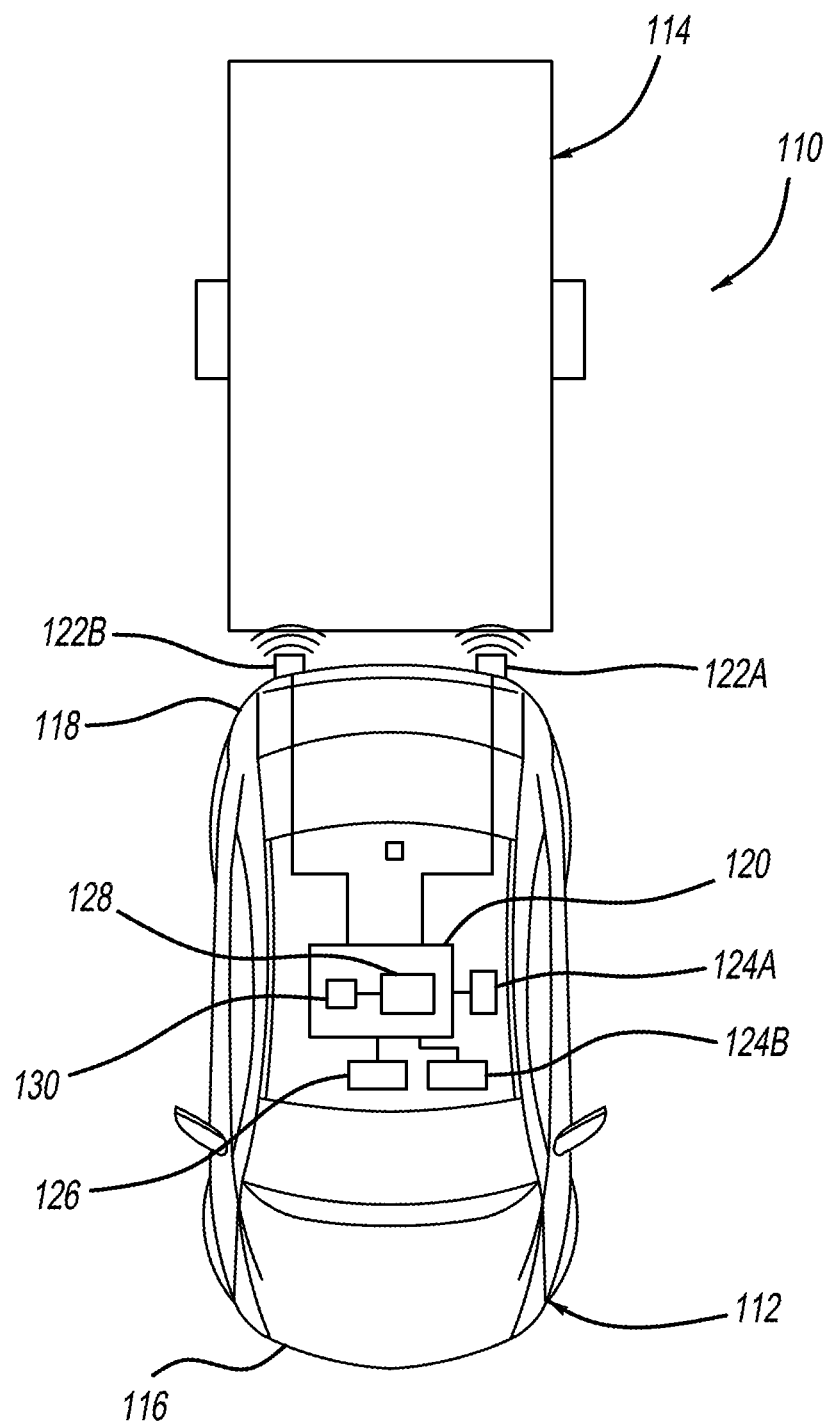
FIG. 1 illustrates a system for determining when a trailer is located behind a vehicle.

Referring to FIG. 1, an overhead view 110 of a vehicle 112 connected to a trailer 114 is shown. It should be understood that the vehicle 112 could be any vehicle capable of transporting persons or objects from one point to another. As such, the vehicle 112 could be an automobile, a sport utility vehicle, truck, commercial vehicle, and the like. However, the vehicle 112 could also be agricultural equipment, such as a tractor, or other commercial or industrial vehicle 112.

As to the trailer 114, the term "trailer" should be interpreted broadly. Here, the trailer 114 is a flatbed trailer, but the trailer 114 may be any device having at least one wheel, and that is capable of being selectively attached to the vehicle 112. As such, the trailer 114 could also be a wagon, enclosed trailer, shipping trailer, or even a recreational trailer having living compartments located inside. Again, it should be understood that these are merely a few examples of what may comprise the vehicle 112 and the trailer 114.

Generally, the vehicle 112 has a forward section 116 and a rearward section 118. The rearward section 118 may include detection devices 122A and 122B located and configured such to detect objects generally behind the vehicle 112. Alternatively, it should be understood that the rearward section 118 may have only one detection device 122A or 122B or may have more than two detection devices. The detection devices 122A and/or 122B may be radar devices that send out radar signals. Any objects receiving these radar signals generally bounce these signals back to the detection devices 122A and/or 122B. This returned signal, when properly processed, can be utilized to determine the presence of an object or objects.

Here, the vehicle 112 includes a system 120 for determining when the trailer 114 is located behind the vehicle 112. The system 120 includes a processor 128 in communication with a memory unit 130. The processor 128 may be a single standalone processor or may be multiple processors working in concert. The processor 128 can be two separate processors processing 122A and 122B individually or in a combined model. The memory unit 130 includes instructions for performing methods disclosed later in this specification. The memory 130 may be any memory device capable of storing digital information. As such, the memory unit 130 may be a solid state device, a magnetic device, an optical device, or the like. Additionally, it should be understood that the memory unit 130 may be separate and apart from the processor 128 or may be integrated within the processor 128.

The vehicle 112 may also include a variety of different sensors for sensing the movement of the vehicle 112. For example, the sensor 124A may be an accelerometer capable of determining acceleration, velocity, and/or distance traveled by the vehicle 112. The sensor 124A may also be able to determine a yaw rate of the vehicle 112. The vehicle 112 may also include other sensors 124B, which may be able to determine the steering wheel angle of the vehicle 112, the wheel speed of one or more wheels of the vehicle 112, or other vehicle-related information. These sensors 124A and/or 124B are in communication with the processor 128 and provide a plurality of signals to the processor 128. It should be understood that the data generated by the sensors 124A and/or 124B may be directed provided to the system 120 or may be provided to the system 120 via another vehicle subsystem that first receives the data from the sensors 124A and/or 124B and determines acceleration, velocity, distance, yaw rate, steering angle, wheel speed, etc.

The vehicle 112 may also include an output device 126 for providing information to either the operator of the vehicle 112 by visual and/or audible cues or provide information to other vehicle systems. As such, as will be explained in the paragraphs that follow in this specification, the determinations made by the system 120 would be provided directly or through further processing such as blind spot monitor system to the output device 126 so as to assist the driver when a trailer 114 is located behind the vehicle 112.

Figure 2:
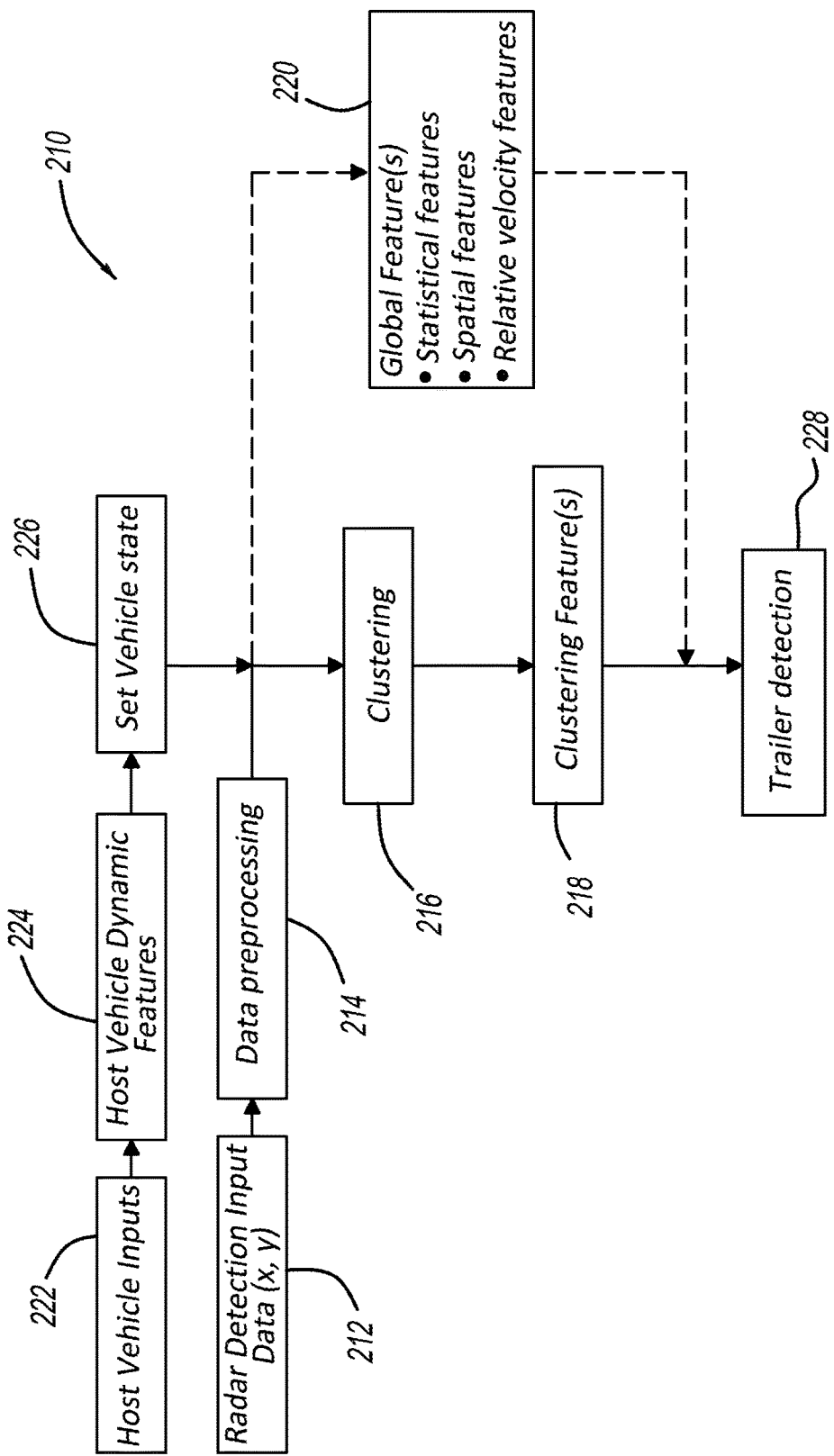
FIG. 2 illustrates a process flow of the system and method for determining when the trailer is located behind the vehicle.

Referring to FIG. 2, a process flow 210 for the method of determining when a trailer is located behind a vehicle is shown. Here, the process flow 210 receives as inputs radar detection input data 212 from the detection devices 122A and 122B of FIG. 1. In addition to this input, host vehicle inputs 222 are also provided. These host vehicle inputs 222 may include data captured by the sensors 124A and/or 124B. As stated previously, this data may relate to the velocity, yaw rate, acceleration, wheel speed, and/or steering wheel angle of the vehicle 112 of FIG. 1.

Block 214 performs data pre-processing which essentially filters the data received from block 212 to remove unnecessary data to simplify processing. In block 216, the data from the detection devices 122A and/or 122B are provided as targets. These targets are clustered to generated cluster features. The clustering may be based on using a variety of different methodologies. For example, hierarchical clustering, centroid-based clustering (k-mean), distribution-based clustering (Gaussian mixture models) and/or density-based clustering may be utilized. For density-based clustering, the location of these targets to each other as well as the total number of targets located within a cluster. Examples of this cluster will be described in the paragraphs that follow in this specification. In block 218, if cluster(s) exists, these cluster(s) are essentially generated cluster features.

In addition to the clustering mentioned in blocks 216 and 218, the data generated by the detection devices 122A and 122B are also utilized to generate global features as shown in block 220. The global features may include statistical features, spatial features and/or relative velocity features. Statistical features of the global features may include of the standard deviation of the targets in either of the x or y-direction or the standard deviation of the difference of the targets in either the x or y-direction. Additionally or alternatively, these statistical features may include the largest difference in the y-direction or principle component analysis of the targets.

As to spatial features, these spatial features may use quantized spatial data in the x-direction or y-direction. This can include a brightest spot shift, ratio of data points in brightest spot in data size, ratio of number of darkest spots and data size, and/or rank of spatial frequency matrix.

As stated earlier, in addition to the data generated by the detection devices 122A and/or 122B, the host vehicle inputs shown in step 222, which may be generated by sensors 124A and/or 124B, are utilized to generate host vehicle dynamic features. The host vehicle dynamic features of block 224 may include the speed of vehicle, acceleration of the vehicle, a curvature of a road the vehicle is traveling on, yaw rate of the vehicle. Block 224 sets the state of vehicle 226. Block 226 may include stop, turning, traveling straight at steady speed, or traveling straight under acceleration The vehicle state of block 226, the clustering features of block 218, and the global features of block 220 are utilized in block 228 to determine if a trailer 114 is located behind the vehicle 112 of FIG. 1. The algorithm utilized to perform and determine if a trailer is present will be described in the paragraphs that follow but may be determined by the use of a majority vote algorithm or a Naïve Bayes classifier type algorithm.

Figure 3:
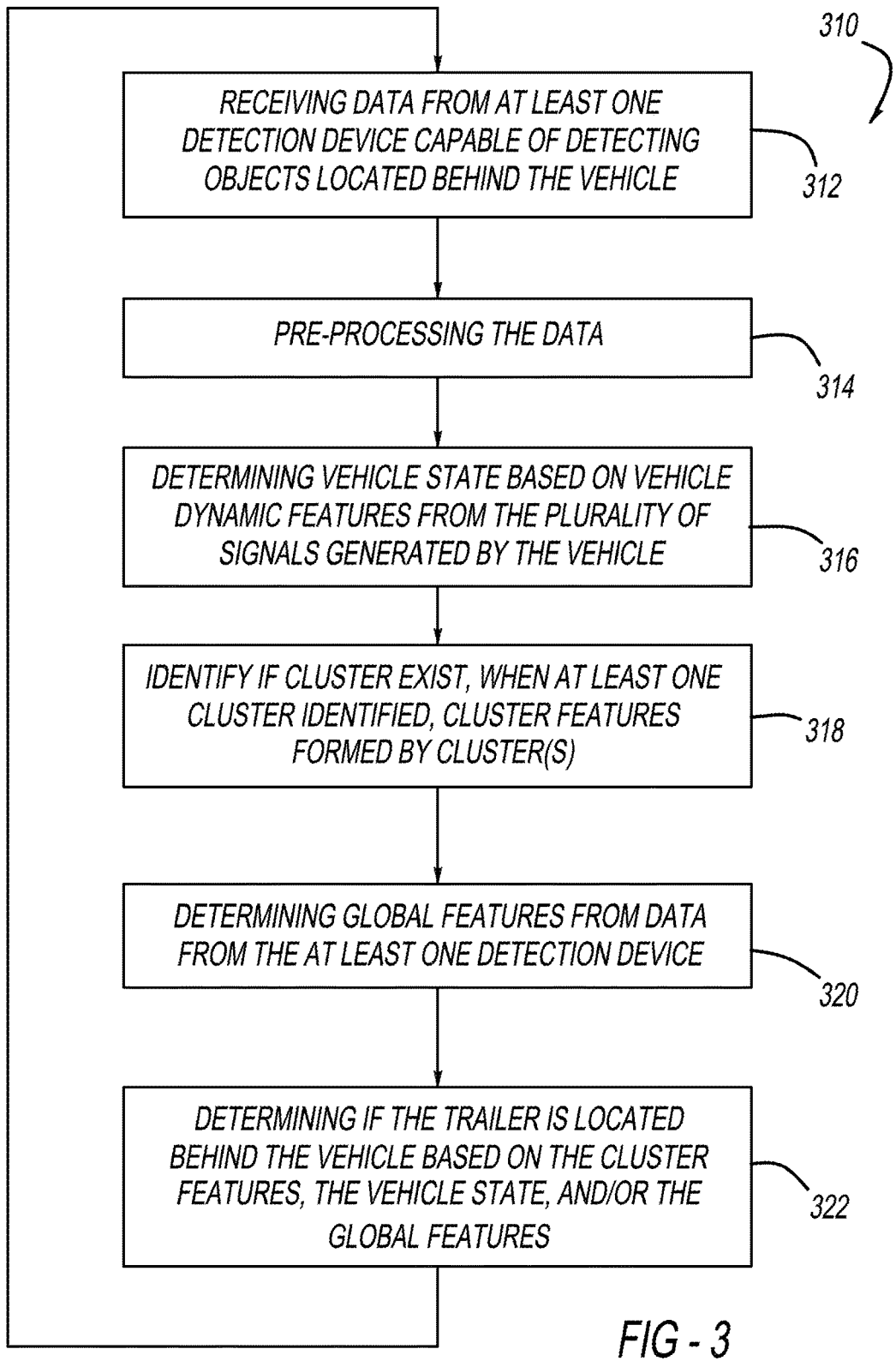
FIG. 3 illustrates a method for determining when the trailer is located behind the vehicle.

Referring to FIG. 3, a method for determining when a trailer is located behind a vehicle is shown. This method may be stored as executable code in the memory 130 of the system 120. The processor 128 may then be configured to execute the executable code embodying this method. Many of the steps of the method 310 have been introduced in the flow diagram 210 of FIG. 2. As such, some of the description of this method 310 may be duplicative.

In step 312, data is received from the at least one detection device, the detection device being configured to detect objects located behind the vehicle. As previously mentioned, the detection device may be one or more radar systems.

In step 314, the method 310 performs pre-processing on the data from the at least one detection device. This pre-processing may include filtering the data to remove targets outside a region of interest, which will be described in greater detail in FIG. 4. Further, this pre-processing may also include filtering the data to remove targets that have a relative speed higher than a certain value. Essentially, the trailer should be traveling at approximately the same speed as the vehicle that pulls it. Using this assumption, any targets that are determined to be traveling faster than the vehicle can be assumed to be noise. It should be understood that the step 314 of pre-processing the data may be optional.

In step 318, the targets are used to identify if a cluster exists. When at least one cluster is identified, cluster features are formed by cluster(s). Hierarchical clustering, centroid-based clustering (k-mean), distribution-based clustering (Gaussian mixture models) and density-based clustering or other methods may be utilized to identify if a cluster exists. For density-based clustering, as will be better described and shown in FIGS. 5 and 6, targets that are near each other are formed into clusters to form cluster features if density-based clustering is utilized. These clusters generally include targets that are within a specified distance from each other. In addition, these clusters are formed only when the number of targets within a cluster exceeds a threshold value. For example, targets may only be clustered to each other if they are approximately 0.5 meters away from each other. In addition to this distance, as an example, the number of targets required to form a cluster may be 6. Therefore, each cluster, in this example, would require six targets that are generally located 0.5 meters away from each other.

In step 316, vehicle dynamic features are determined from the plurality of signals generated by the vehicle. The vehicle dynamic features are used to set vehicle state. As stated before, the plurality of signals generated by the vehicle could be signals generated by the sensors 124A and/or 124B. Additionally, it should be understood that the data provided to determine the vehicle dynamic features may not come directly from the sensors 124A and/or 124B, but may come from other vehicle systems that interpret the data sent from one or more sensors. The determined vehicle dynamic features may include a curvature of a road the vehicle is traveling on, yaw rate of the vehicle. Also, the vehicle dynamic features set the state of the vehicle. The state of the vehicle may include a determination if the vehicle is stopped, turning, traveling straight at a steady speed, or traveling straight under acceleration. For reasons of interpretation, the term "acceleration" should be given its classical meaning, in that it includes acceleration in a positive direction or acceleration in a negative direction, i.e. deceleration.

In step 320, global features are determined from data from the at least one detection device. The global features may include statistical features, spatial features and/or relative velocity features. Statistical features of the global features may include of the standard deviation of the targets in either of the x or y-direction or the standard deviation of the difference of the targets in either the x or y-direction. Additionally or alternatively, these statistical features may include the largest difference in the y-direction or principle component analysis of the targets.

As to spatial features, these spatial features may use quantized spatial data in the x-direction or y-direction. This can include a brightest spot shift, ratio of data points in brightest spot in data size, ratio of number of darkest spots and data size, and/or rank of spatial frequency matrix. As to relative velocity features, these can include the ratio of data, such as the ratio of data in different relative speed bins.

It should also be understood that step 316 is generally performed first, while steps 318 and 320, may be performed in any order or may be performed concurrently.

In step 322, a determination is made when the trailer is located behind the vehicle based on the cluster features, the vehicle state, and/or the global features. The global features may be used for enhancement proposes. This determination may be made by setting a threshold (confidence level) for the global features and the cluster features, wherein exceeding the threshold is indicated that the trailer is located behind the vehicle. Additionally or alternatively, this step may be accomplished by weighing the cluster features, and the vehicle dynamic features and/or the global features in view of the state of the vehicle. Different cluster features and/or global features will be selected based on different vehicle states. As mentioned earlier, the state of the vehicle may include if the vehicle is stopped, turning, traveling straight at a steady speed, or traveling straight under acceleration.

Furthermore, step 322 may be accomplished by using a majority vote type algorithm. In a majority vote type algorithm, thresholds are set for different features, such as the clustering features and the global features. Different vehicle states, determined from the vehicle dynamic features, can be utilized to determine which features should be utilized in determining if a trailer is located behind the vehicle. For example, if the vehicle is turning, clustering features and global features such as spatial features and image features may be useful in making this determination. If the vehicle is traveling straight under acceleration, the relative speed of the vehicle, as well as statistical features of the global features, may be utilized. This may also be the case if the vehicle is traveling straight at a steady speed. In this majority vote algorithm, if a certain number of features, for example, 6 out of 10 features are satisfied, a counter could be increased indicating the confidence level in that a trailer is located behind the vehicle.

Another way of performing step 322 may include the Naïve Bayes classifier. Here, a training process is first performed followed by a detection process. This type of process will be utilized to increase or decrease a counter which is indicative of the confidence level that a trailer is located behind the vehicle.

Figure 4:
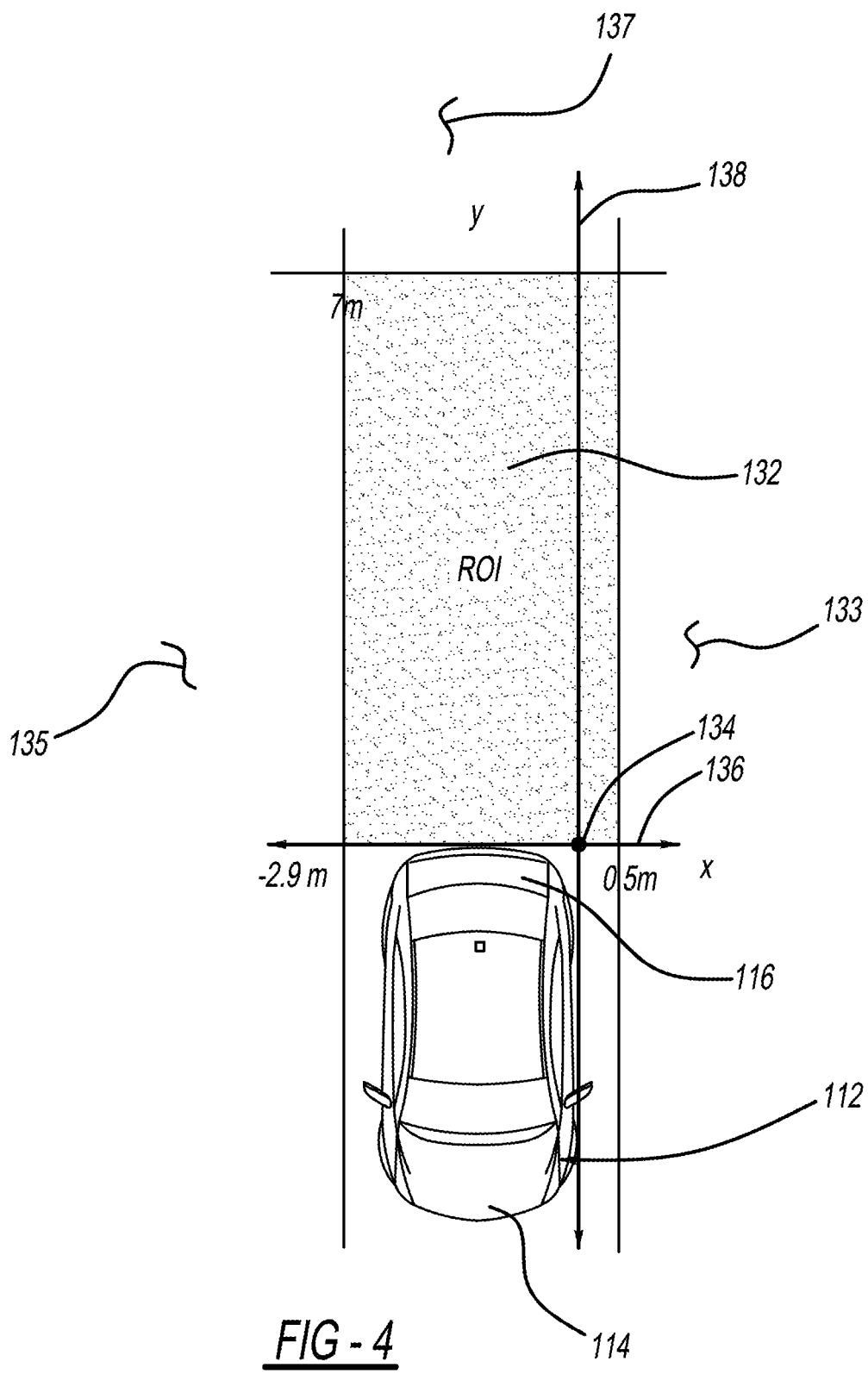
FIG. 4 illustrates a visual example of pre-processing data from a detection device.

Referring to FIG. 4, a visual example of the pre-processing of the data of step 314 of FIG. 3 is shown. Here, the vehicle 112 is shown, wherein the vehicle includes a forward portion 114 and a rearward portion 116. As stated earlier, the trailer is generally attached to the vehicle 112 such that it follows the rearward portion 116 of the vehicle 112. As such, a region of interest 132 is located behind the vehicle 112. Here, the region of interest is defined by an origin 134 that is defined by the x coordinates 136 and the y coordinates 138. The region of interest may extend in the y-direction 138 by a certain distance. In this example, the distance is 7 meters. In the x direction 136, the distance may be 0.5 meters in one direction from the origin 134 and 2.9 meters the other direction from the origin 134. Of course, it should be understood that these are merely examples and may change based on the type of vehicle 112 utilized and/or the type of trailer that may be utilized.

Targets that are located within the region of interest 132 are not filtered from the data provided to the processor to perform the clustering. However, data at locations 133, 135, and 137 are filtered, as they are not within the region of interest 132 and will not be considered during the clustering process.

Also, as stated earlier, the pre-processing of the data may also include removing targets that have a velocity different from that of the vehicle 112. If a trailer is located behind the vehicle 112, the trailer, and therefore the associated targets, should be traveling at the same velocity as the vehicle 112. Targets that are not traveling at the same or similar velocity of the vehicle 112 can be removed.

Figure 5:
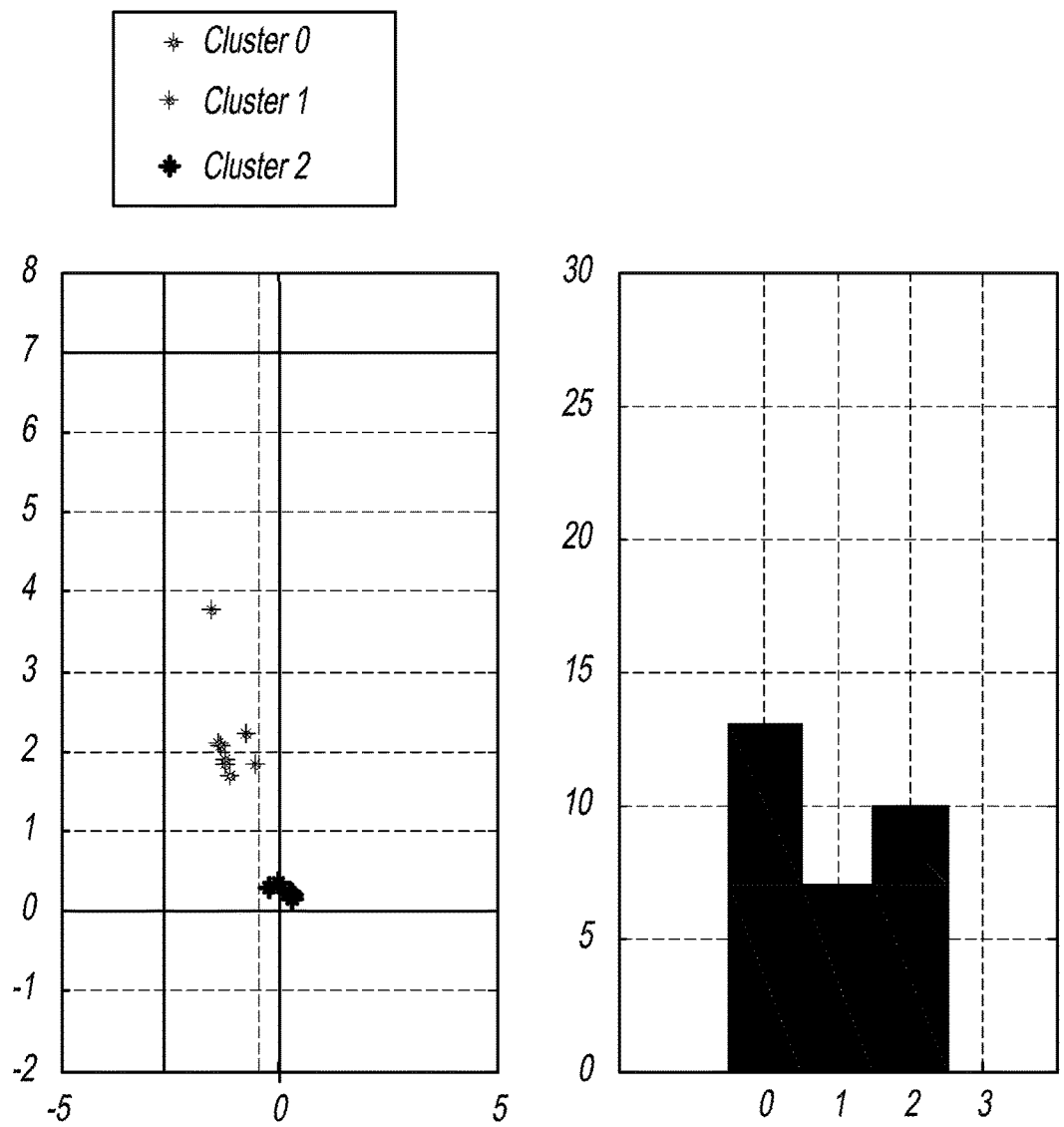
FIG. 5 illustrates an example of clustering when a trailer is not located behind a vehicle.

Referring to FIG. 5, an example of clustering the targets is shown, wherein the clustered targets are indicative that a trailer is not located behind a vehicle. Here, there are three clusters, cluster 0, cluster 1, and cluster 2. The location of these clusters is shown in the left-most graph. In the right-most graph, the number of targets located in each cluster is shown. Here, cluster 0 contains approximately 13 targets, cluster 1 contains approximately seven targets, and cluster 2 contains approximately ten targets. Cluster0 is noise cluster, targets in this cluster has less than 6 neighbors within 0.5 meters. Based on the spread of the targets in the clusters shown in the left-most graph and the fact that not many targets are located within each cluster shown in the right-most graph and are clustered into a noise cluster, the system and method may determine that this clustering feature is not indicative that a trailer is located behind the vehicle.

Figure 6:
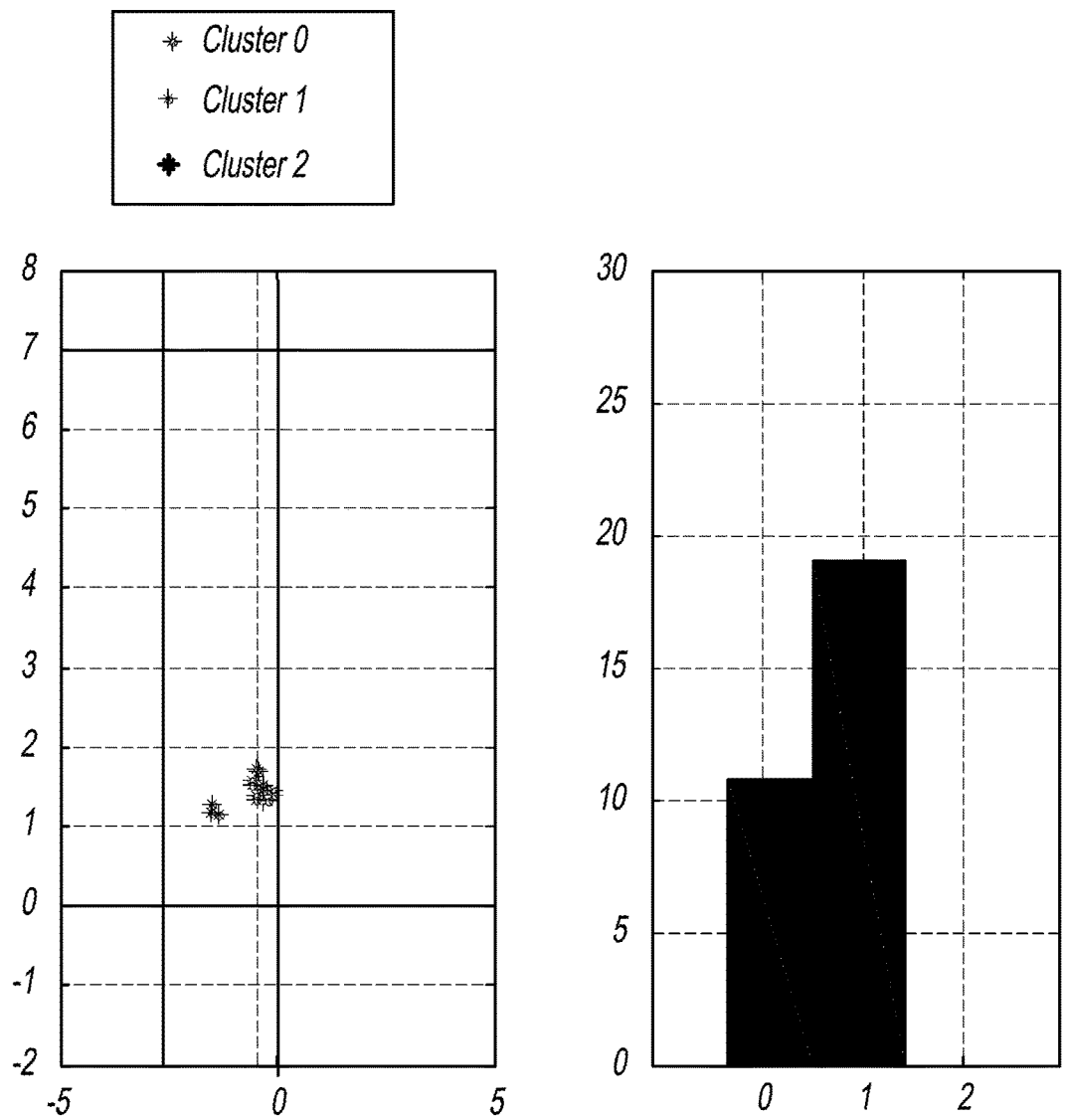
FIG. 6 illustrates an example of clustering when the trailer is located behind the vehicle.

Conversely, in FIG. 6, the example of clusters that are indicative that a trailer is behind a vehicle is shown. Here, as shown in the left-most graph, clusters 0, 1, and 2 are generally tightly packed together. In the right-most graph, cluster 1 has a significant number of targets. Cluster 2 has no targets, while cluster 0 has an in-between number of targets. Cluster0 is noise cluster, which has less target than Cluster 1. Also over half of targets (19/30) in Cluster1, which means 19 targets have more than 6 targets within 0.5 meters. This essentially means that the number of targets is closely packed around cluster 1 and to a lesser extent around cluster 0. This generally indicates that the cluster features of FIG. 6 are indicative of when a trailer is located behind the vehicle.

Figure 7:
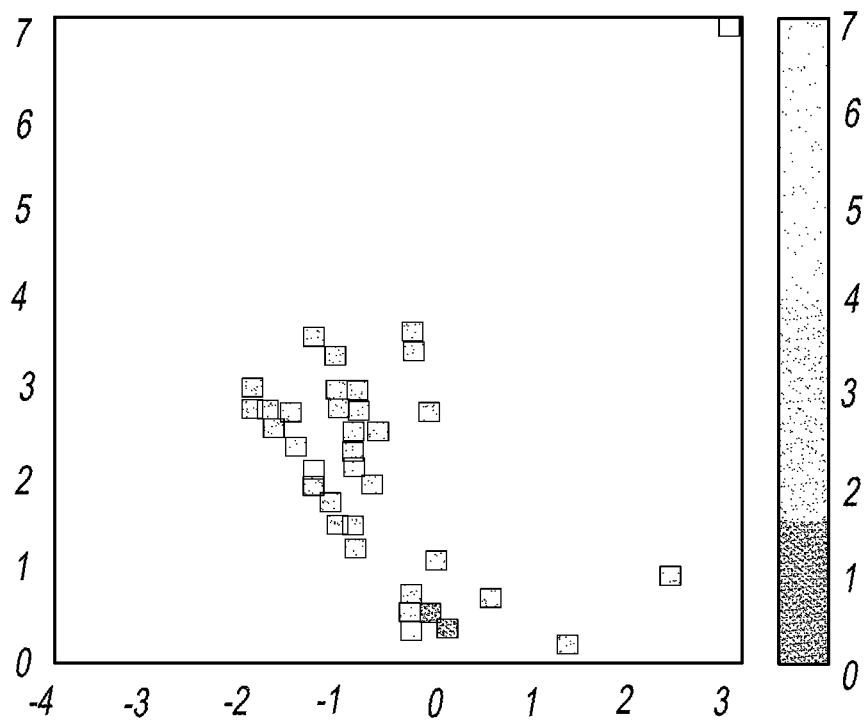
FIG. 7 illustrates an example of quantized spatial data in lateral and longitudinal distance in a grid form without the trailer located behind the vehicle.
Figure 8:
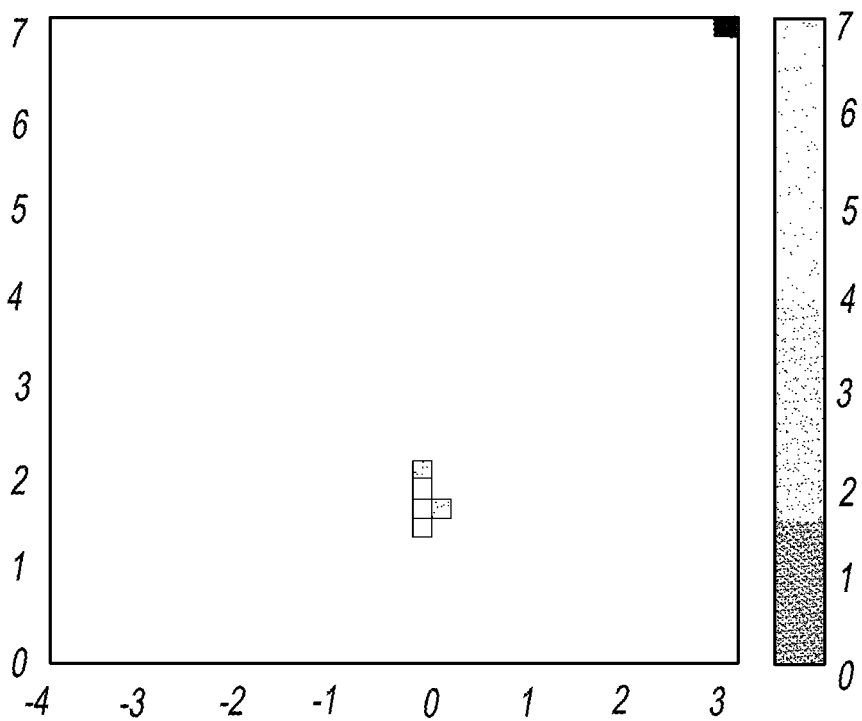
FIG. 8 illustrates an example of quantized spatial data in a lateral and longitudinal distance with the trailer located behind the vehicle.

As stated previously in this specification, global features are also used in determining if a trailer is located behind a vehicle. FIG. 7 shows a quantized spatial data in both lateral distance and longitudinal distance and the count number of data points in each grid. As the number of data points increase, the color of the grid becomes brighter. As can be shown in FIG. 7, the number of targets is spread out, and very few are concentrated. This global feature indicates that a trailer is not located behind a vehicle. FIG. 8, on the other hand, shows targets more closely packed together and located in one general area. This is indicative that a trailer is located behind a vehicle.

As such, the system and method described in this invention significantly improves detecting a trailer located behind a vehicle with fewer false positives and false negatives. This is because the system and method utilizes radar data to cluster targets to create cluster features as well as to create global features. In addition, vehicle dynamic features are also utilized in the determination process.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation, and change, without departing from the spirit of this invention, as defined in the following claims.

The invention claimed is:

1. A system for determining when a trailer is located behind a vehicle, the system comprising:
   at least one detection device configured to detect objects located behind the vehicle;
   a processor, the processor being in communication with the at least one detection device and a plurality of signals generated by the vehicle;
   the processor being configured to:
      receive data from the at least one detection device, the data including a plurality of targets detected by the at least one detection device,
      identify if at least one cluster exists and cluster the targets into at least one cluster to form cluster features when at least one cluster exists,
      determine a vehicle state based on vehicle dynamic features from the plurality of signals generated by the vehicle, wherein vehicle state includes at least one of the following: stopped, turning, traveling straight at a steady speed, or traveling straight under acceleration,
      determine global features from data from the at least one detection device, the global features include statistical features, spatial features and relative velocity features, statistical features include at least one of the following: standard deviation of the targets in either the X or Y direction or the standard deviation of the difference of the targets in either the X or Y direction, the largest difference in the Y direction or principle component analysis of the targets, spatial features include quantized spatial data in the X direction or Y direction, relative velocity features include ratio of data in different relative speed bins; and
      determine when the trailer is located behind the vehicle based on the vehicle state and at least one of the cluster features or the global features.

2. The system of claim 1, wherein the at least one detection device is a radar device.

3. The system of claim 1, wherein the processor is configured to identify the location of detected targets or cluster the targets utilizing either hierarchical clustering, centroid-based clustering (k-mean), distribution-based clustering (Gaussian mixture models) or density-based clustering.

4. The system of claim 3 wherein processor is configured to use density based clustering and when using density-based clustering, the at least one cluster only includes targets that are a specified distance from each other and the total number of targets within a cluster exceeds a threshold value.

5. The system of claim 1, wherein the processor is further configured to determine when the trailer is located behind the vehicle by setting a threshold for the global features and the cluster features, wherein exceeding the threshold is indicative that the trailer is located behind the vehicle.

6. The system of claim 1, wherein the processor is further configured to determine when the trailer is located behind the vehicle by weighing the cluster features or the global features based on the state of the vehicle.

7. The system of claim 1, wherein the processor is further configured to pre-process the data before clustering occurs.

8. The system of claim 7, wherein the pre-process includes filtering the data to remove targets outside a region of interest.

9. The system of claim 7, wherein the pre-process includes filtering the data to remove targets that have a relative speed higher than a certain value.

10. The system of claim 1, wherein the spatial features include a brightest spot shift, ratio of data points in brightest spot in data size, ratio of number of darkest spots and data size, or rank of spatial frequency matrix.

11. A method for determining when a trailer is located behind a vehicle, the method comprising:
receiving data from at least one detection device configured to detect objects located behind the vehicle, the data including a plurality of targets detected by the at least one detection device;
identifying if at least one cluster exists and clustering the targets into at least one cluster to form cluster features when at least one cluster exists;
determining a vehicle state based on dynamic features from a plurality of signals generated by the vehicle, wherein the vehicle state includes at least one of the following: stopped, turning, traveling straight at a steady speed, or traveling straight under acceleration;
determining global features from data from the at least one detection device, the global features include statistical features, spatial features, and relative velocity features, statistical features include at least one of the following: statistical features of the standard deviation of the targets in either the X or Y direction or the standard deviation of the difference of the targets in either the X or Y direction, the largest difference in the Y direction or principle component analysis of the targets, spatial features include quantized spatial data in the x-direction or y-direction, relative velocity features include ratio of data in different relative speed bins; and
determining when the trailer is located behind the vehicle based on the vehicle state and at least one of the cluster features or the global features.

12. The method of claim 11, wherein the at least one detection device is a radar device.

13. The method of claim 11, further comprising identifying the location of detected targets or clustering the targets utilizing either hierarchical clustering, centroid-based clustering (k-mean), distribution-based clustering (Gaussian mixture models) or density-based clustering.

14. The method of claim 13 wherein the location of targets or clustering of targets is identified using density-based clustering, and the at least one cluster only includes targets that are a specified distance from each other and the total number of targets within a cluster exceeds a threshold value.

15. The method of claim 11, further comprising determining when the trailer is located behind the vehicle by setting a threshold for the global features and the cluster features, wherein exceeding the threshold is indicative that the trailer is located behind the vehicle.

16. The method of claim 11, further comprising determining when the trailer is located behind the vehicle by weighing the cluster features or the global features based on the state of the vehicle.

17. The method of claim 11, further comprising pre-processing the data before the step of clustering occurs.

18. The method of claim 17, wherein the step of pre-processing includes filtering the data to remove targets outside a region of interest.

19. The method of claim 17, wherein the step of pre-processing includes filtering the data to remove targets that have a relative speed higher than a certain value.

20. The method of claim 11, wherein the spatial features include a brightest spot shift, ratio of data points in brightest spot in data size, ratio of number of darkest spots and data size, or rank of spatial frequency matrix.

\* \* \* \* \*